United States Patent [19]
Blum et al.

[11] Patent Number: 6,133,337
[45] Date of Patent: Oct. 17, 2000

[54] USE OF REACTIVE PREPOLYMERIC ORGANIC COMPOUNDS

[75] Inventors: Rainer Blum, Ludwigshafen; Thomas Loerzer, Landau; Günther Hegemann; Gunther Baumgarten, both of Hamburg, all of Germany

[73] Assignee: BASF Aktiengesellschaft, Ludwigshafen, Germany

[21] Appl. No.: 09/101,243

[22] PCT Filed: Dec. 20, 1996

[86] PCT No.: PCT/EP96/05769

§ 371 Date: Sep. 30, 1998

§ 102(e) Date: Sep. 30, 1998

[87] PCT Pub. No.: WO97/25361

PCT Pub. Date: Jul. 17, 1997

[30] Foreign Application Priority Data

Jan. 4, 1996 [DE] Germany ............ 196 00 146

[51] Int. Cl.⁷ ............... C08F 2/46; C08F 2/48
[52] U.S. Cl. ............ 522/104; 522/96; 522/90; 522/91; 522/108; 523/500; 526/346
[58] Field of Search ............ 522/96, 90, 91, 522/104, 108; 523/500; 526/346

[56] References Cited

U.S. PATENT DOCUMENTS

| | | | |
|---|---|---|---|
| 4,801,629 | 1/1989 | Stavinoha et al. | 523/500 |
| 5,319,006 | 6/1994 | Yang et al. | 523/500 |
| 5,620,751 | 4/1997 | Brindoepke et al. | 427/506 |

FOREIGN PATENT DOCUMENTS

| | | |
|---|---|---|
| 101585 | 2/1984 | European Pat. Off. . |
| 118786 | 9/1984 | European Pat. Off. . |
| 166449 | of 1986 | European Pat. Off. . |
| 166449 | 2/1986 | European Pat. Off. . |
| 186165 | 2/1986 | European Pat. Off. . |
| 260688 | 3/1988 | European Pat. Off. . |
| 302484 | 2/1989 | European Pat. Off. . |
| 430906 | 5/1991 | European Pat. Off. . |
| 585742 | 3/1994 | European Pat. Off. . |
| 684284 | 11/1995 | European Pat. Off. . |
| 1570323 | 2/1970 | Germany . |
| 3107450 | 10/1982 | Germany . |
| 1057727 | 2/1967 | United Kingdom . |

*Primary Examiner*—James J. Seidleck
*Assistant Examiner*—Sanza McClendon
*Attorney, Agent, or Firm*—Keil & Weinkauf

[57] ABSTRACT

The invention relates to the use of reactive prepolymeric organic compounds, containing structural units having at least one readily abstractable hydrogen with a bond energy of not more than 397 kJ/-mol and having at least one ethylenic double bond, for crosslinking, with or without free-radical initiators, by means of heat, high-energy radiation or heat and high-energy radiation.

10 Claims, No Drawings

USE OF REACTIVE PREPOLYMERIC ORGANIC COMPOUNDS

The present invention relates to the use of reactive prepolymeric organic compounds for crosslinking, with or without free-radical initiators, by means of heat, high-energy radiation or heat and high-energy radiation.

Substances of this kind can be reacted, ie. polymerized further or cross-linked, using high-energy radiation, preferably UV light, or by means of free radicals at room temperature, using known combinations of peroxides and co-initiators, for example heavy metal salts, or by means of heat, using thermal free-radical initiators such as peroxides, azo initiators or C-C-labile compounds. These methods of initiating reaction can also be used in any desired combination, with possibilities including both the combined use of thermally generated free radicals with UV-generated free radicals and reaction to a B-stage, ie. a partially reacted state at which the reaction is terminated and can be reinitiated at a later point in time.

These reactive prepolymers may find application as paint binders, as coating compositions, for the preparation of compact or cellular, reinforced or nonreinforced molding compounds, casting compositions, electrical-insulation compositions, daylight-curable roadmarking paints, sealants and coating compositions, or as printing ink binders, binders for nonwovens, adhesives, prepregs, etc.

Unsaturated polyester resins containing dihydrodicyclo-pentadiene (DHCPD) structural units, which resins are generally used dissolved in monomeric reactive diluents such as styrene, α-methylstyrene, vinyltoluene, allyl phthalate, acrylates, vinylates or the like, are the subject of numerous patents. The use of these reactive diluents, which in the case of, for example, powder coatings may also be solid substances, is regarded in the prior art as being essential, owing to the inadequate homopolymerizability of the maleic and fumaric acid double bonds.

DE 31 07 450 relates to unsaturated polyesters which have oligomers of cyclopentadiene as end groups and can be used, as solutions in ethylenically unsaturated monomers, for preparing moldings and coatings; the use thereof without reactive diluents, however, cannot be derived from this document.

EP 101 585-A relates to unsaturated polyester resins which are modified by the addition of cyclopentadiene onto the double bond of the polyester and are then dissolved in vinyl monomers.

EP 118 786-A describes unsaturated polyester resins which are modified with dicyclopentadiene and, dissolved in vinyl or allyl monomers, are cured in a two-stage process to give molding compounds offering high temperature stability.

EP 260 688-A also relates to polyester resins, which are dissolved in vinylic monomers.

DE 32 30 924-A describes a special process for preparing polyester resins which contain cyclopentadiene structures and are dissolved in vinyl monomers.

EP 585 74 2-A relates to mixtures of solid substances containing unsaturated polyester resins and polyurethane acrylate resins. These mixtures are suitable as powder coatings which, after being melted, are crosslinked under UV light in the presence of UV initiators.

EP 0 684 284-A1 describes synergistic mixtures of unsaturated polyether ester resins and dicyclopentadiene polyester resins, which are dissolved in styrene and are cured in the presence of peroxidic catalysts.

DE-A-15 702 73 describes polyesters whose ends carry 5- or 6-membered imide rings, derived for example from tetrahydro-phthalimidoethanol, and are dissolved in unsaturated monomers.

The present invention provides for the use of reactive prepolymeric organic compounds, containing structural units having at least one readily abstractable hydrogen with a bond energy of not more than 397 kJ/mol and having at least one ethylenic double bond, for crosslinking, with or without free—radical initiators, by means of heat, high-energy radiation or heat and high-energy radiation.

Preferred such compounds are those whose readily abstractable hydrogens are a to a double bond (allylic hydrogens), and especially those whose readily abstractable hydrogens have been incorporated into the prepolymers by way of structures of the formulae (I), (II), (III) and/or (IV),

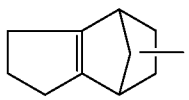

(I)

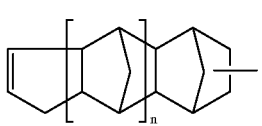

(II)

n = 1 to 10

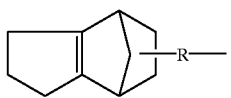

(III)

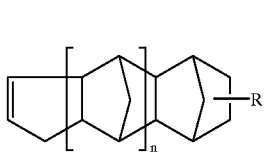

(IV)

n = 1 bis 10 where —R— is oxygen or a divalent radical having one or more ester, amide, urethane and/or ketone groups or is a salt-type bond, or are incorporated by way of structures of the formulae (V), (VI), (VII), (VIII), (IX) and/or (X) or by way of esters of isoprenol (Va)

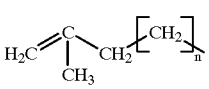

(V)

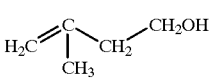

(Va)

where n=1 to 20,

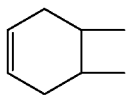

(VI)

-continued

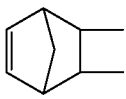

(VII)

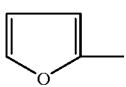

(VIII)

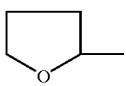

(IX)

(X)

The reactive prepolymeric organic compounds to be used in accordance with the invention can be unsaturated polyester resins based on α,β-olefinically unsaturated dicarboxylic acids and into which at least one of the groups containing readily abstractable hydrogens, of the formulae (I) to (X), has been incorporated, or are mixtures of unsaturated polyester resins which are based on α,β-olefinically unsaturated dicarboxylic acids and are devoid of groups having readily abstractable hydrogens and prepolymeric organic compounds containing groups having readily abstractable hydrogens.

These prepolymeric organic compounds may also be derived from monofunctional alcohols, polyfunctional alcohols, alkoxylation products thereof, polyetherpolyols, polyesterpolyols, polytetrahydrofuran and/or polycaprolactone, which at the ends contain structural units which are attached by way of esters of α,β-olefinically unsaturated dicarboxylic acids and which have readily abstractable hydrogens.

Particular preference is given to the use of reactive prepolymeric organic compounds which are liquid at room temperature or have softening ranges in accordance with DIN 53180 of less than 130° C. at a viscosity of below 100,000 mPas at 100° C. and at the same time are stable in terms of viscosity for at least 24 hours at a temperature at which they have a viscosity of not more than 10,000 mPas, and are melted or heated in the course of processing.

The reactive prepolymeric substances to be used in accordance with the invention can be employed, alone or together with other binders and/or organic and/or inorganic fillers, as paint binders, as coating compositions, for the preparation of compact or cellular, reinforced or nonreinforced molding compounds, casting compositions, electrical-insulation compositions for electrical windings, wire enamels for insulating winding wires in electrical engineering, daylight-curable roadmarking paints, sealants and coating compositions, or as printing ink binders, as adhesives or as binders for ordered and random-laid, planar or any shaped fiber support materials made from organic or inorganic substances.

The reactive prepolymeric organic compounds to be used in accordance with the invention can be employed together with customary free-radical initiators, C-C-labile substances and reaction accelerators, with stabilizers and with further additives from the group consisting of viscosity regulators, flow improvers and gloss enhancers.

Furthermore, the reactive prepolymeric organic compounds to be used in accordance with the invention can, for curing, be employed together with one or more curing mechanisms, known per se, selected from cocrosslinking with polyfunctional isocyanates, amino resins and polyfunctional epoxides.

The reactive prepolymeric organic compounds to be used in accordance with the invention contain structural units having at least one readily abstractable hydrogen with a bond energy of not more than 397 kJ/mol and having at least one ethylenic double bond.

Data on bond energy are given in the literature and can be taken, for example, from Morrison, Robert Thornton, Organic Chemistry (Table: Homolytic Bond Dissociation Energies, on the inside cover) in Library of Congress Cataloging-in-Publication Data ISBN-205-08453-2 (1987) by Allyn and Bacon, Inc., A Division of Simon & Schuster, Newton, Mass., U.S.A.

These reactants may be present in the same molecule. The reactive prepolymeric substances (organic compounds) may also, however, consist of mixtures of prepolymers containing only the readily abstractable hydrogens with prepolymers containing only the ethylenic double bonds. It is also possible in the course of curing to employ one or more known curing mechanisms, for example cocrosslinking with polyfunctional isocyanates, amino resins, such as melamine-, urea- or benzoguanamine-formaldehyde resins, polyfunctional epoxides, etc. The additionally employable crosslinking mechanisms may also lead to formation of interpenetrating networks in the coatings, by means of which specific, desirable properties, eg. particularly high chemical resistance, are often achieved.

The novel structural units having at least one readily abstractable hydrogen with a bond energy of not more than 397 kJ/mol are incorporated, for example, by way of structures of the formulae (I) to (IV) derived from dihydrodicyclopentadiene

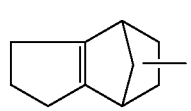

(I)

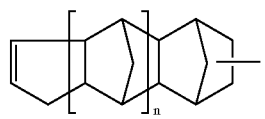

(II)

n = 1 to 10

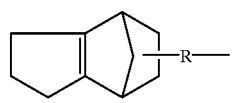

(III)

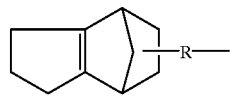

(IV)

n = 1 to 10 where —R— is oxygen or a divalent radical having one or more ester, amide, urethane and/or ketone groups or is a salt-type bond.

Examples of other structures which can be incorporated into the novel substances by way of the readily abstractable hydrogens are radicals from the group consisting of isoalkyls, aminoisoalkyls, cycloisoalkyls, cycloisoalkyls having one or more heteroatoms, isoalkylaryls, or structures of the formulae below, where n=2 or 3, R² is a bivalent aliphatic or aromatic radical of, for example, up to 8 carbons, or is a single bond, R³ is a bivalent aliphatic, cycloaliphatic, heterocyclic or aromatic radical, substituted or unsubstituted, or is a single bond, R⁴ is H, straight-chain or branched alkyl of, for example, 1–8 carbons, halosubstituted aryl or isoamylphenyl, R⁵ is alkyl, halosubstituted alkyl, halosubstituted aryl or isoamylphenyl, for example

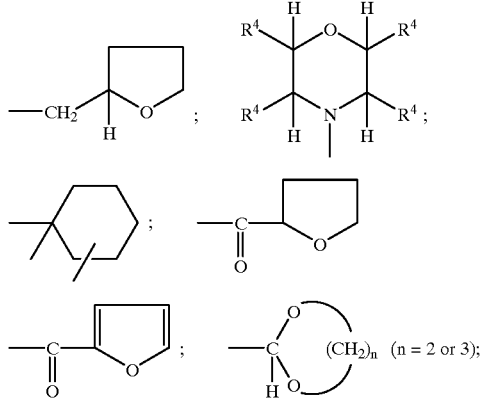

-continued

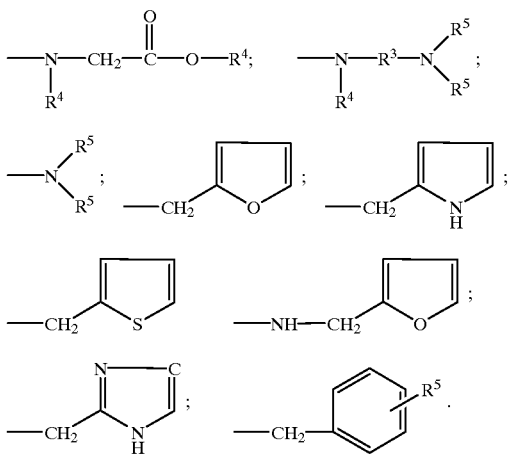

The reactive prepolymeric organic compounds to be used in accordance with the invention can be either linear or contain one or more branching sites and possess, for example, the structures reproduced by formulae (XI) and (XII), where —R— is a bridging group or a single bond and D— is a structure having readily abstractable hydrogens. In this context the ethylenic double bonds can be both in the radicals —R— and at other sites in the molecule or in any prepolymeric substances devoid of D— which are mixed with prepolymeric substances containing D—. The structures reproduced by formulae (XI) and (XII) are intended merely to illustrate the principle by way of example.

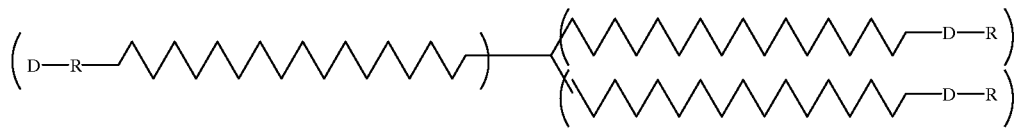

(XI)

(XII)

-continued

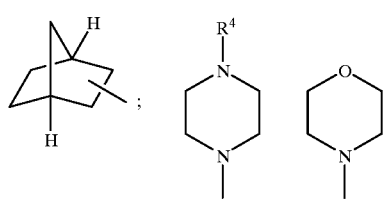

Substances accessible with particular ease are those in which —R— is an ester group, and can be obtained by addition of dicyclopentadiene (DCPD) onto polyfunctional polycarboxylic acids, in which reaction the use of catalysts such as boron trifluoride etherate may be necessary for a high conversion. Adducts which are very easy to obtain are those of maleic anhydride and water with DCPD, of formulae (XIII) and (XIV).

In the case of adducts of the formulae (XIII) and (XIV) and novel reactive prepolymeric substances based on these, no distinction is made between the isomers fumaric acid and maleic acid; depending on the reaction conditions, different proportions of the isomers are formed. Any mixtures are within the scope of the present invention.

(XIII)

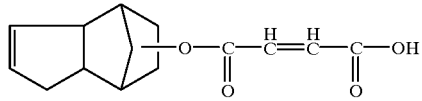

(XIV)

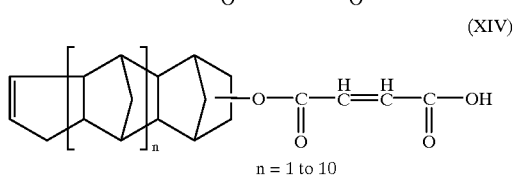

n = 1 to 10

Using these substances it is easy to obtain, by reaction with carboxyl-reactive polymers, the substances to be used in accordance with the invention. Examples of such polymers are mono- and polyfunctional hydroxy compounds, carboxylic esters of mono- and polyfunctional polymeric hydroxy compounds, mono- and polyfunctional polymeric epoxides, hydroxy-functional natural oils and resins, epoxidized natural oils and resins, mono- and polyfunctional polymeric isocyanates, and mono- and polyfunctional polymeric amines.

Dihydrodicyclopentadienol of the formula (XV) and isoprenol of the formula (Va) are commercially available and can be used to synthesize the novel substances by reaction with OH reactive substances.

(XV)

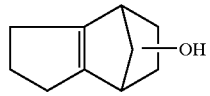

Furthermore, groups containing allylic hydrogens can be introduced by way of the imides of cyclic unsaturated dicarboxylic acids with aminocarboxylic acids or amino alcohols. Examples are shown by the formulae (XVI) and (XVII). Other substances having readily abstractable hydrogens and OH groups are endomethylenetetrahydrophthalic acid and derivatives thereof, such as methylendomethylenetetrahydrophthalic acid or endomethylenetetrahydrophthalimidols of the formula (XVI)

(XVI)

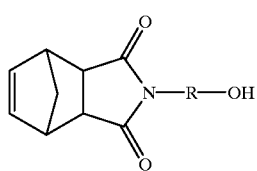

and tetrahydrophthalic acid and its derivatives, such as methyltetrahydrophthalic acid and tetrahydrophthalimidols of the formula (XVII)

(XVII)

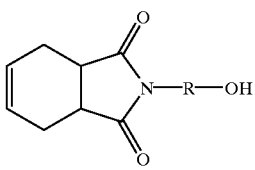

These compounds are suitable for synthesizing the novel substances, by reaction with OH reactive substances.

Where the substances to be used in accordance with the invention contain double bonds in the polymer chain, for example as maleic or fumaric or itaconic esters, then grafting with cyclopentadiene produces endomethylenetetrahydrophthaloyl structures of the formula (XVIII), which also contain readily abstractable hydrogens.

(XVIII)

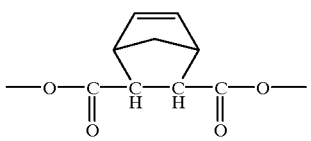

Furthermore, derivatives of cyclic dicarboxylic acids containing allylic hydrogen are obtained by Diels-Alder reaction of maleic acid-containing polyesters with other dienes, such as butadiene or pentadiene.

An important class of substances to be employed in accordance with the invention comprises the esters of substances of the formulae (XIII) and (XIV) and of the maleic and fumaric monoesters of isoprenol with alkoxylated mono- and polyols, each of which esters may include 2–2000 ethylene oxide and/or propylene oxide units per molecule, examples being ethoxylated or propoxylated trimethylolpropane, ethoxylated or propoxylated pentaerythritol, ethoxylated or propoxylated glycerol, polyethylene glycol monoalkyl ethers, polypropylene glycol monoalkyl ethers, polyester- and polyetherpolyols of the polyethylene oxide, polypropylene oxide, polytetrahydrofuran and polycaprolactone type. The introduction of molecular pseudo-plasticity and improved elasticity for the cured substances is achieved by incorporating long-chain polyethylene terephthalate units or polybutadienediol. Also suitable are esters of the abovementioned hydroxy compounds with the mono-esters of alcohols having readily abstractable hydrogens, for example furfuryl alcohol, tetrahydrofurfuryl alcohol, 1-alkylalkenols or substances of the formulae (XVI) and (XVII) with dicarboxylic acids, for example maleic acid, fumaric acid, itaconic acid, citraconic acid, phthalic acid and isomers thereof.

By the type of alkoxylating agent and the degree of alkoxylation it is possible in such novel substances to control, as well, properties of the end products, such as, for example, hardness, hydrophilicity and elasticity. It is possible in this context for the polyols to be only partially esterified, with the remaining hydroxyls either being left free, esterified or etherified with other substances which may or may not contain readily abstractable hydrogens, or reacted with other reactive substances. Examples of compounds suitable for this purpose are isocyanates or epoxides. Also of importance are hydroxyl- containing natural oils such as castor oil, for example. Another important class of substances comprises unsaturated polyester resins based on α,β-unsaturated carboxylic acids such as maleic acid, fumaric acid, itaconic acid and/or citraconic acid containing structural units having readily abstractable hydrogens. As already mentioned above, unsaturated polyester resins containing DCPD structural units, which are used as solutions in monomeric reactive diluents such as styrene, α-methylstyrene, vinyltoluene, allyl phthalate, acrylates and vinylates or the like, are the subject of numerous patents. The use of these reactive diluents, which in the case of powder coatings, for example, may also be solid substances, is considered in the prior art to be essential owing to the inadequate homopolymerizability of the maleic or fumaric acid double bonds.

Unsaturated polyester resins for the purposes of the present invention are polyesters, known per se, which include structural units having readily abstractable hydrogens. The polyesters to be used in accordance with the invention are synthesized by known, prior art polyester preparation techniques, generally by polycondensation of polyfunctional hydroxy compounds with polyfunctional acids and/or their anhydrides at elevated temperatures. In addition, it is often advantageous to start from the esters of such substances, and to produce the polyesters by transesterification at elevated temperatures, since transesterification reactions of this kind in some cases proceed more readily and more rapidly than the direct esterification. It is also possible, by using (in part or in toto) polyfunctional amines, to obtain binders having amide structures. The partial use of monofunctional starting materials is also possible in order, for example, to regulate the molecular weight. The starting materials listed in the text below should be regarded merely as examples for illustrating the invention.

Examples of suitable starting materials are: di- and polycarboxylic acids, such as adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid, pyromellitic acid, di- and polyols, such as ethylene glycol, polyethylene glycols, propylene glycol, polypropylene glycols, butanediol isomers, hexanediol, neopentylglycol, trimethylolpropane, glycerol, pentaerythritol, bisphenol A, hydrogenated bisphenol A, OH-polyfunctional polymers, such as hydroxyl-modified polybutadienes or hydroxyl-carrying polyurethane prepolymers and epoxy resins, polyfunctional natural substances or derivatives thereof, such as linseed oil fatty acid. Also of importance are alkoxylated OH-functional substances, examples being the ethoxylation and propoxylation products of the abovementioned polyols.

The introduction of amide and imide structures is also known prior art in accordance with DE-A-15 70 323. Such polyester amides or polyester imides are able to meet certain requirements, for example in respect of thermal stability, in many cases better than pure polyesters. The synthesis of the polyesters within the scope of the present invention, with specific requirements relating, for example, to hardness, elasticity, viscosity and/or softening point, is done in accordance with rules known to the skilled worker. For example, the skilled worker is aware of how to vary the elasticity of cured polyester resins by the chain length of the polyols or polycarboxylic acids. For example, polyester resins synthesized using hexanediol or adipic acid are more flexible than those based on phthalic acid and ethylene glycol. Furthermore, the control of the properties by the additional use of polyfunctional substances, which produce branching in the polyester molecules, such as trimellitic acid or trimethylolpropane, is known to the skilled worker. In this context, the introduction of structural components having readily abstractable hydrogens into the polyesters can be carried out, for example, by the additional use of cocondensable starting materials which carry readily abstractable hydrogens. Readily and inexpensively obtainable starting materials of this kind are the adducts of maleic anhydride and water with DCPD, of formulae (XIII) and (XIV), which can be used along with other compounds to synthesize the polyesters.

Furthermore, it is also possible to use dihydrodicyclopentadienol of formula (XV) in the synthesis of the polyesters, thereby likewise introducing structures having readily abstractable hydrogens.

Examples of other substances for synthesizing polyesters containing structural components having readily abstractable hydrogens are 1-methylalkenols, tetrahydrophthaloylaminoalkanols of formula (XVI), endomethylenetetrahydrophthaloylaminoalkanols of formula (XVII), isoprenol, furfurol and tetrahydrofurfurol.

The majority of unsaturated polyesters are very highly viscous or solid resins. A particular feature of the present invention is the use of novel substances of the formulae (XI) and (XII), which are not customary polyester resins and in some cases are low-viscosity liquids with a very high boiling point; as a result, they represent reactive diluents which are specifically adapted to the novel systems and are devoid of the disadvantages of the known, monomeric reactive diluents, containing acrylic or vinylic unsaturation, such as styrene or monomeric acrylates. These substances carry two or more of the reactive groups having readily abstractable hydrogens, or contain these groups in high molar concentration, in the case of monoesters of lower alcohols or diols with substances of the formulae (XIII) and (XIV). They are therefore highly reactive crosslinking agents which in many cases can be used alone but are preferably present along with other substances in customary linear polyester resins or those with low degrees of branching.

It is therefore possible to establish the softening range or viscosity range important for application without generating higher emissions in the course of processing and curing. Thus, polyesters of relatively high melt viscosity and high softening point can be used for the present invention and the desired, low processing viscosity can be established by adding these substances. It is also possible to use, in part, polyesters already known per se. The reactivity of the substances with themselves, and especially the novel reactive mixtures of unsaturated polyester resins with polyfunctional substances which are not polyesters, and correspond to the formulae (XIII) and (XIV), for crosslinking, without the partial use of monomeric or polymeric reactive diluents, are novel.

Following the addition of substances which form free radicals on heating, the reactive prepolymeric substances to be used in accordance with the invention are able to cure thermally. Examples of known free-radical initiators are peroxides, azo compounds, azides and C-C-labile substances. A considerable acceleration in curing, or reduction in curing temperature, can be achieved with metal coinitiators, for example compounds of cobalt, manganese, iron, nickel or lead.

Furthermore, in the presence of UV initiators of the α-cleaving type (Norrish type I) or of the H-donor/acceptor system type (Norrish type II), the novel polymers are of high UV sensitivity.

It is also possible to produce substances to be used in accordance with the invention and which have enhanced photosensitivity as a result of the fact that their molecule carries H-acceptor groups, which can, for example, be incorporated by way of hydroxy-functional phenone compounds such as hydroxybenzophenone or bishydroxybenzophenone, for example.

The substances to be used in accordance with the invention, alone or together with other binders and/or organic and/or inorganic fillers, can be employed as paint binders, as coating compositions, for the preparation of compact or cellular, reinforced or nonreinforced molding compounds, casting compositions, electrical-insulation compositions, daylight-curable roadmarking paints, sealants and coating compositions, or as printing ink binders, adhesives, as binders for ordered and random-laid, planar or formed fiber support materials made from organic or inorganic materials.

The novel substances are, in general, liquid and can be used directly. If they are of too high a viscosity for processing or are solid, they can also be heated, melted or used as a solution in solvents or dispersed in water.

EXAMPLE 1

| | | |
|---|---|---|
| 661.10 g | Dicyclopentadiene | (5.0 mol) and |
| 490.30 g | maleic anhydride | (5.0 mol) | were weighed into a stirring flask fitted with heater and distillation device.

The mixture was then heated to 125° C. under a gentle stream of nitrogen, and then

| | |
|---|---|
| 95.00 g water | (5.0 mol + 5 g) | were added from a dropping funnel over the course of one hour. The mixture was left to after-react at 125° C. for one hour. A monocarboxylic acid of the formula (XIII) was formed which contains readily abstractable hydrogens. The contents of the flask were cooled to 70° C., and then

| | |
|---|---|
| 1730.00 g | ethoxylation product of trimethylolpropane and ethylene oxide having an OH number of 165, |
| 4.00 g | dibutyltin dilaurate and |
| 4.00 g | hydroquinone | were added.

The mixture was then heated rapidly to 120° C. under a gentle stream of nitrogen. Subsequently, over the course of 6 hours, the temperature was raised gradually to 190° C. and the water of condensation produced was removed by distillation, to give a highly viscous liquid having an acid number of 18.

EXAMPLE 2

| | |
|---|---|
| 490.80 g | maleic anhydride (5.0 mol) | were weighed into a stirring flask fitted with heater and distillation device and were heated to 100° C. under a gentle stream of nitrogen, and then

| | |
|---|---|
| 444.80 g | isoprenol (5.1 mol) (2-methyl-but-1-ene-4-ol) | were added from a dropping funnel over the course of one hour. A slightly exothermic reaction took place. The mixture was then left to after-react at 125° C. for one hour. A monoester of maleic/fumaric acid with isoprenol was formed, which has readily abstractable hydrogens. The contents of the flask were cooled to 70° C., and then

| | |
|---|---|
| 1730.00 g | ethoxylation product of trimethylolpropane and ethylene oxide having an OH number of 165, |
| 4.00 g | dibutyltin dilaurate and |
| 4.00 g | hydroquinone | were added. The mixture was heated rapidly to 120° C. under a gentle stream of nitrogen. Subsequently, over the course of 6 hours, the temperature was raised gradually to 190° C. and the water of condensation produced was removed by distillation, to give a highly viscous liquid having an acid number of 26.

EXAMPLE 3

| | |
|---|---|
| 490.30 g | maleic anhydride (5.0 mol) and |
| 913.10 g | tetrahydrophthaloylaminoethanol (5.1 mol) (substance of formula (XVII) where R = —$C_2H_4$—) | were weighed into a stirring flask fitted with heater and distillation device. The contents of the flask were heated under a gentle stream of nitrogen and melted above about 70° C., and an exothermic reaction developed. After the reaction had subsided, heating was continued at 125° C. for one hour. A monoester of maleic/fumaric acid with tetrahydrophthaloylaminoethanol was formed, which contains readily abstractable hydrogens.

The contents of the flask were cooled to 70° C., and then

| | |
|---|---|
| 1730.00 g | ethoxylation product of trimethylolpropane and ethylene oxide having an OH number of 165 and |
| 4.00 g | dibutyltin dilaurate | were added. The mixture was heated rapidly to 120° C. under a gentle stream of nitrogen. Subsequently, over the course of 6 hours, the temperature was raised gradually to 190° C. and the water of condensation produced was removed by distillation, to give a soft resin having an acid number of 31.

Comparison Example

| | |
|---|---|
| 490.30 g | maleic anhydride (5.0 mol) | were weighed into a stirring flask fitted with heater and distillation device and were heated to 100° C. under a gentle stream of nitrogen. Then

| | |
|---|---|
| 775.20 g | 1,3-phenoxypropanol (5.1 mol) | were added from a dropping funnel over the course of one hour, during which a slightly exothermic reaction took place. The mixture was left to after-react at 125° C. for one hour. The monoester of maleic/fumaric acid with 1,3-phenoxypropanol was formed, which contains no readily abstractable hydrogens. The contents of the flask were cooled to 70° C. and then

| | |
|---|---|
| 1730.00 g | ethoxylation product of trimethylolpropane and ethylene oxide having an OH number of 165 |
| 4.00 g | dibutyltin dilaurate and |
| 4.00 g | hydroquinone | were added. The mixture was heated rapidly to 120° C. under a gentle stream of nitrogen. Subsequently, over the course of 6 hours, the temperature was raised gradually to 190° C. and the water of condensation produced was removed by distillation, to give a liquid of medium viscosity having an acid number of 18.

Curability Testing of the Products of the Above Examples and in the Comparison Example The compounds of Examples 1 to 3 and the Comparison Example were used, for greater ease of handling, as 80% solutions in methyl ethyl ketone. 4% of t-butyl perbenzoate and 3% of benzophenone, based on the total quantity of dissolved substances, were added to the solutions.

The solutions were knife-coated onto steel panels in a coat thickness of about 80 μm. The solvent was removed from the films at 40° C. under reduced pressure over the course of 3 hours, giving tack-free films. The films were first of all irradiated with a medium-pressure mercury lamp at an energy level of 80 mW/cm² for 240 seconds. In the case of Examples 1 to 3, this gave a tack-free skin beneath which there were still tacky constituents; the tack of the Comparison Example product was unchanged. The panels were then baked in an oven at 180° C. for 30 minutes. After cooling, hard, ethanol-resistant films with good flexural strength were obtained in the case of Examples 1 to 3; even after baking there was virtually no reduction in the tack of the Comparison Example product.

We claim:

1. A process for the preparation of crosslinked polymeric organic compounds by crosslinking, with or without free-radical forming initiators, by means of heat and/or high-energy radiation, in the absence of ethylenically unsaturated monomeric reactive diluents, at least one first prepolymer containing structural units having at least one ethylenic double bond and a softening range of less than 130° C., wherein either said first prepolymer also contains structural units having at least one readily abstractable hydrogen with a bond energy of not more than 397 kJ/mol, wherein the readily abstractable hydrogens are incorporated into the prepolymer by way of structures of the formula (I), (II), (III), (IV), (V), (VIII), (IX),

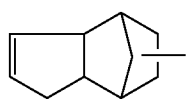

(I)

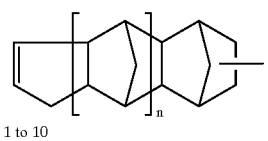

n = 1 to 10

(II)

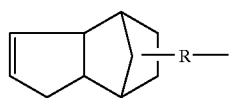

(III)

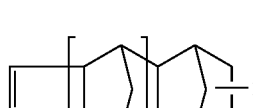

n = 1 to 10

(IV)

where —R— is oxygen or a divalent radical having one or more ester, amide, urethane and/or ketone groups or is an ionic bond,

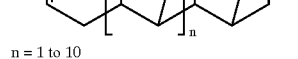

where n = 1 to 20

(V)

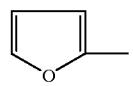

(VIII)

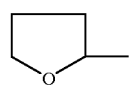

(IX)

or by way of esters of isoprenol, or wherein said at least one first prepolymer is mixed with at least one second prepolymer containing said structural units having at least one readily abstractable hydrogen.

2. A process as claimed in claim 1, wherein polymeric organic compounds are selected for crosslinking which contain structural units having at least one ethylenic double bond and structural units having at least one readily abstractable hydrogen with a bond energy of not more than 397 kJ/mol in the same molecule.

3. A process as claimed in claim 1, wherein the readily abstractable hydrogens are α to a double bond (allylic hydrogens).

4. A process as claimed in claim 1, wherein the readily abstractable hydrogens are incorporated by way of structures of the formula (V)

(V)

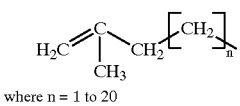

where n = 1 to 20 or by way of esters of isoprenol.

5. A process as claimed in claim 1, wherein the readily abstractable hydrogens are incorporated by way of structures of the formula (VIII) and/or (IX)

(VIII)

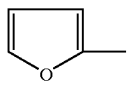

(IX)

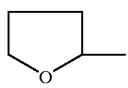

6. A process as claimed in claim 2, wherein said prepolymers are unsaturated polyester resins based on α,β-olefinically unsaturated dicarboxylic acids into which at least one of the groups containing readily abstractable hydrogens, of the formulae (I), (II), (III), (IV), (V), (VII) and (IX), or a group resulting from an isoprenol ester, has been incorporated.

7. A process as claimed in claim 1, wherein the crosslinked polymeric organic compounds are formed from mixtures of unsaturated polyester resins which are based on α,β-olefinically unsaturated dicarboxylic acids and are devoid of groups having readily abstractable hydrogens, and prepolymers containing groups having readily abstractable hydrogens.

8. A process as claimed in claim 1. wherein said first or second, or both first and second, prepolymers are derived from monofunctional alcohols, polyfunctional alcohols, alkoxylation products thereof, polyether polyols, polyester polyols, polytetrahydrofuran and/or polycaprolactone, which at the ends contain structural components which are attached by way of esters of α,β-olefinically unsaturated dicarboxylic acids and which have readily abstractable hydrogens.

9. A process as claimed in claim 1, wherein either or both of said prepolymers include customary free-radical initiators, C-C-labile substances and reaction accelerators, stabilizers and further additives from the group consisting of viscosity regulators, flow improvers and gloss enhancers.

10. A process as claimed in claim 1, wherein cross linking is carried out using one or more crosslinking agents, selected from polyfunctional isocyanates, amino resins and polyfunctional epoxides.

* * * * *